Patented Aug. 14, 1923.

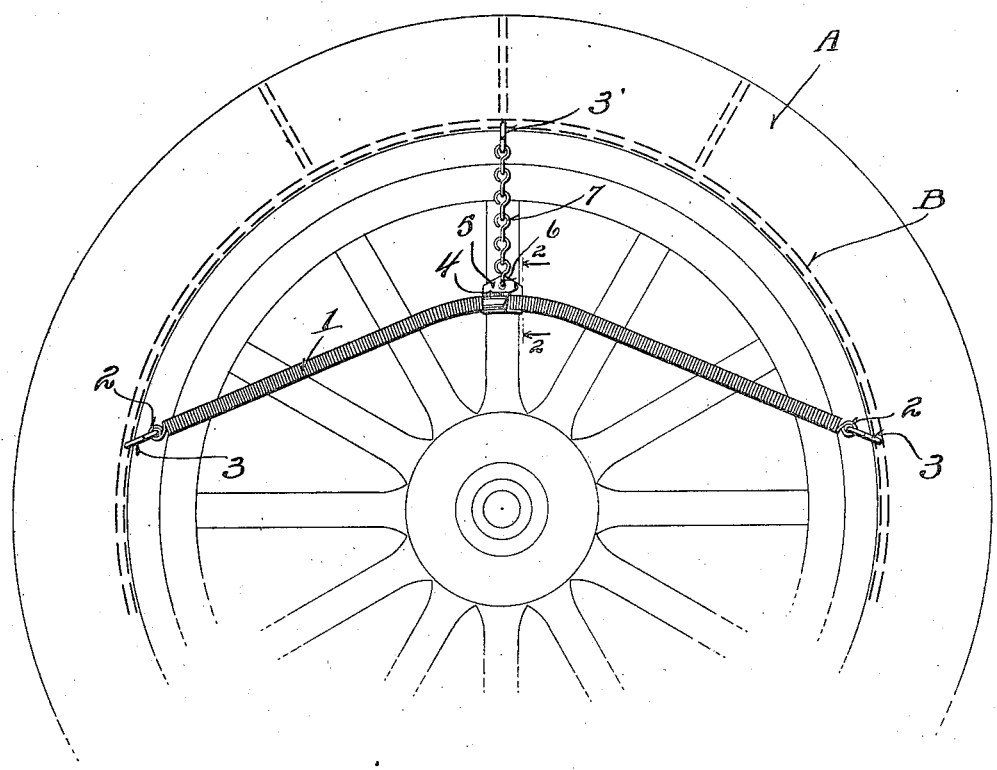
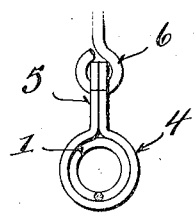

1,464,553

UNITED STATES PATENT OFFICE.

CHARLES WETHERN, OF EAU CLAIRE, WISCONSIN.

AUTOMOBILE TIRE-CHAIN TIGHTENER.

Application filed June 24, 1921. Serial No. 480,032.

*To all whom it may concern:*

Be it known that I, CHARLES WETHERN, a citizen of the United States, and resident of Eau Claire, in the county of Eau Claire and State of Wisconsin, have invented certain new and useful Improvements in Automobile Tire-Chain Tighteners; and I do hereby declare that the following is a full, clear, and exact description thereof.

My invention refers to anti-skid tire chains and it has for its object to provide a simple, economical and effective resilient three-point contact means for tensioning such chains upon the wheel to which they are attached.

Another object of my invention is to provide a chain tightener of the above character, as a new article of manufacture, wherein a standard type of spring is utilized in connection with a clip and runner, whereby the spring is capable of independent movement within the clip to compensate for tension at the three points of pull.

With the above and other minor objects in view, the invention consists in certain peculiarities of construction and combination of parts, as are hereinafter set forth with reference to the accompanying drawings and subsequently claimed.

In the drawings:

Figure 1 represents a side elevation of a fragment of a wheel having attached thereto a chain tightener embodying the features of my invention, and Figure 2 is a detail cross-section through the clip element associated with a coil spring leg.

Referring by characters to the drawings, A represents the wheel and its associated tire, having fitted thereto a standard chain B, which is indicated in dotted lines, as it forms no part of my invention. 1 represents a closed coil continuous spring stretch, the ends of which are formed into loops 2 adapted to receive the corresponding looped ends of hooks 3, which hooks are thus loosely engaged with the spring ends and are adapted to engage certain links of the chain B upon opposite sides of the wheel axis. The spring stretch is arranged to pass through a centrally disposed clip 4, which clip initially comprises a blank that is folded about the body of the spring and having companion apertured ears 5, that are brought together and are confined by an end link 6 of a chain stretch 7, which stretch carries a hook 3' that is similar in construction to the hooks 3.

Attention is directed to the fact that all of these parts are standard, and can be purchased in open market, with exception of the clip which can be formed by a simple die operation. The structure, when thus assembled, is capable of tightening the tire chain at three points and any variations in pull strain are compensated for by the clip which will automatically adjust itself to the center of the stretch of coil spring.

Thus it will be seen that a new article of manufacture is developed, the cost of manufacture of which is reduced to a minimum and its efficiency is equal to or greater than that of chain tighteners wherein the cost of manufacture is comparatively high.

I claim:

In a device of the class described a close coil spring, an elongated cylinder having a smooth bore, said close coil spring being slidable freely in said bore, said cylinder being formed of a thin blank having edges meeting upon a line extending longitudinally of said cylinder, a flat ear integral with one of said edges, a second ear integral with the other of said edges, said ears being in close superficial contact, said first mentioned ear having an opening therein, said second ear having an opening aligned with said first mentioned opening, said openings registering and a chain having an end directed through said openings and secured to said ears.

In testimony that I claim the foregoing I have hereunto set my hand at Eau Claire, in the county of Eau Claire and State of Wisconsin.

CHARLES WETHERN.